(12) United States Patent
Quittek et al.

(10) Patent No.: US 8,401,807 B2
(45) Date of Patent: Mar. 19, 2013

(54) METHOD AND SYSTEM FOR ENERGY CONSUMPTION MONITORING IN AN ICT ENVIRONMENT

(75) Inventors: Jurgen Quittek, Nussloch (DE); Thomas Dietz, Weingarten (DE); Dominique Dudkowski, Heidelberg (DE); Jochen Schramm, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 277 days.

(21) Appl. No.: 12/936,919

(22) PCT Filed: Apr. 17, 2009

(86) PCT No.: PCT/EP2009/002821
§ 371 (c)(1),
(2), (4) Date: Oct. 8, 2010

(87) PCT Pub. No.: WO2010/118760
PCT Pub. Date: Oct. 21, 2010

(65) Prior Publication Data
US 2011/0172937 A1    Jul. 14, 2011

(51) Int. Cl.
*G06F 19/00* (2011.01)
(52) U.S. Cl. .......... 702/60
(58) Field of Classification Search .......... 702/60
See application file for complete search history.

(56) References Cited

U.S. PATENT DOCUMENTS

| 7,373,221 | B2 | 5/2008 | Lal |
| 2004/0254686 | A1 | 12/2004 | Matsui et al. |
| 2005/0033481 | A1 | 2/2005 | Budhraja et al. |
| 2006/0080076 | A1 | 4/2006 | Lahiri et al. |

FOREIGN PATENT DOCUMENTS

WO    2009/042581 A1    4/2009

OTHER PUBLICATIONS

Mirjam Harmelink, theory-based policy evaluation of 20 energy efficiency instruments, Publish Jul. 1, 2008 Springer Science, p. 131-148.*
Translation of Korean Office Action, dated Mar. 28, 2012, from corresponding Korean application No. 2010-7025189.
International Search Report, dated Mar. 26, 2010, from corresponding PCT application.

* cited by examiner

*Primary Examiner* — Tung S Lau
(74) *Attorney, Agent, or Firm* — Young & Thompson

(57) ABSTRACT

A method for energy consumption monitoring in an ICT environment, wherein the ICT environment (1) includes a multitude of energy consuming components (2, 3), at least partly the components (2, 3) being instrumented with elements for energy consumption monitoring and/or having assigned specific energy consumption models that derive one or more energy metrics for the respective component (2, 3) from the component's (2, 3) current performance metrics, is characterized in the steps of ascertaining changes of and/or related to the ICT environment (1) via an energy consumption monitoring controller (7), performing an assessment of available energy consumption monitoring techniques both instrumentation-based and model-based, based on the result of the assessment selecting one or more energy consumption monitoring techniques that best satisfy the change of the ICT environment (1) according to predefined policies. Furthermore, a corresponding monitoring system is described.

21 Claims, 2 Drawing Sheets

METHOD AND SYSTEM FOR ENERGY CONSUMPTION MONITORING IN AN ICT ENVIRONMENT

Figure 1:
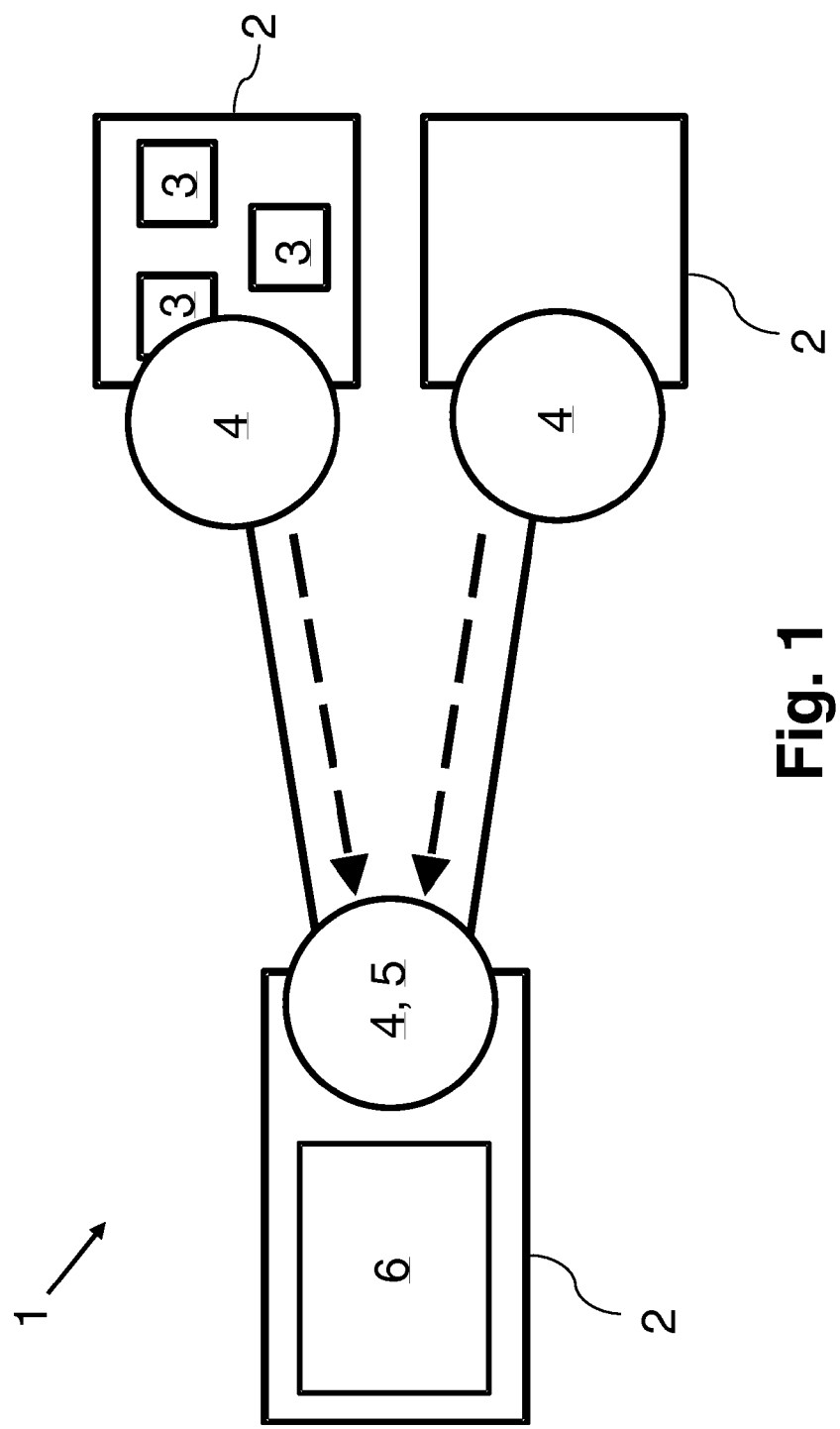

The present invention relates to a method and a system for energy consumption monitoring in an ICT environment, wherein said ICT environment includes a multitude of energy consuming components, at least partly said components being instrumented with means for energy consumption monitoring and/or having assigned specific energy consumption models that derive one or more energy metrics for the respective component from said component's current performance metrics.

Knowledge about the energy consumption of ICT (Information and Communications Technology) devices, which are electric or electronic devices like e.g. network switches, IP phones, PCs, is essential for the enforcement of power saving modes on a suitable subset of devices in an ICT environment. However, while today's devices are equipped with a multitude of hardware and software support that directly report performance parameters (e.g. processor load, hard drive activity, network throughput), most devices lack the means to report their current or accumulated energy consumption.

Energy saving plans for e.g. enterprise and public operator networks typically start with an assessment of the status quo, which requires to measure energy consumption in order to identify saving potentials of a large number of networked devices. After applying measures for saving energy, measurement is required again to continuously quantify the achievements. Hence, accurate energy consumption monitoring functions are an essential prerequisite for any energy management approach for large-scale and heterogeneous network environments.

On one side, a major problem is that sufficient physical instrumentation to directly report the instantaneous or accumulated energy consumption of ICT devices, from which monitoring techniques could be selected at all, is missing in the first place. While approaches exist where complementary external sensors are plugged into the power circuit to which ICT devices are connected (e.g. described in U.S. Pat. No. 7,373,221 B2), this kind of instrumentation is often expensive in monetary terms, the manual effort is extensive, and it is not appropriate due to the security constraints in accessing the sensitive power grid of an enterprise's or public operator network's ICT environment.

On the other side, as already mentioned above today's computing and communication devices are instrumented with a multitude of sensors that report, for instance, on processor speed, hard drive activity, the network interface's I/O throughput, and even mainboard temperature. It has been shown in the state of the art that such information can be used to build energy consumption models (ECMs), which are functions that are able to compute values for a component's energy consumption from a set of parameters of the component. In such model-based energy consumption monitoring approaches, performance parameters of ICT devices that are not immediately related to energy consumption metrics are monitored. Using a suitable energy consumption model, the measured values of one or more of a device's performance parameters are then used to estimate the device's instantaneous or accumulated energy consumption.

Previous research, as described for instance in US2006/0080076 A1, has shown that the accuracy that can be achieved with model-based energy consumption monitoring is acceptable in many cases. However, currently there are no means built into ICT devices and environments to make systematic use of this technology.

It is therefore an object of the present invention to improve and further develop a method and a system of the initially described type for energy consumption monitoring in an ICT environment in such a way that, by employing mechanisms that are readily to implement, energy consumption related information is retrieved in an efficient, reliable, comprehensive and accurate manner even in large-scale and heterogeneous network environments.

In accordance with the invention, the aforementioned object is accomplished by a method comprising the features of claim 1. According to this claim such a method is characterized in the steps of ascertaining changes of and/or related to said ICT environment by means of an energy consumption monitoring controller, performing an assessment of available energy consumption monitoring techniques both instrumentation-based and model-based, based on the result of said assessment selecting one or more energy consumption monitoring techniques that best satisfy said change of said ICT environment according to predefined policies.

Furthermore, the aforementioned object is accomplished by a system comprising the features of independent claim 13. According to this claim, such a system is characterised in that it comprises an energy consumption monitoring controller configured to ascertain changes of and/or related to said ICT environment and to perform an assessment of available energy consumption monitoring techniques both instrumentation-based and model-based, wherein said energy consumption monitoring controller includes selection means for selecting, based on the result of said assessment, one or more energy consumption monitoring techniques that best satisfy said change of said ICT environment according to predefined policies.

According to the invention it has first been recognized that currently existing energy consumption monitoring systems achieve a rather poor overall performance as these systems consider only single aspects of a complex ICT environment while other aspects remain completely ignored. In contrast thereto, the present invention makes systematic use of all available energy consumption monitoring techniques, i.e. model-based in conjunction with instrumentation-based monitoring techniques.

Furthermore, the present invention introduces an automatic selection of energy consumption monitoring techniques into the monitoring process. To this end, changes of and/or related to the ICT environment being monitored are ascertained by means of an energy consumption monitoring controller (ECMC). The changes may be regarded as external stimuli triggering the ECMC to perform an assessment of available energy consumption monitoring techniques both instrumentation-based and model-based in order to systematically discover a way of how to effectively react to the observed change. The invention further proposes to select one or more energy consumption monitoring techniques that— based on the results of the performed assessment—prove to be most appropriate to react upon the ascertained change of the ICT environment. In this connection a policy or a set of policies will be defined, e.g. from an administrative or operator side, specifying parameters according to which the assessment results are analyzed in order to determine the energy monitoring consumption technique(s) that best satisfy(s) the change of the ICT environment.

It is to be noted that the term "ICT environment" is to be understood in a broad sense and includes all environments in which several energy consuming devices are distributed. However, the present invention proves to be particularly useful in large and dynamic environments with a multitude of heterogeneous energy consuming components, as the automatic selection and placement of appropriate instrumentation-based as well as model-based monitoring techniques allows for a very flexible and profound reaction to any changes in the environment. Specifically, but without limitation, the ICT environment may be an enterprise network consisting of networked office equipment and/or industrial machines, a home network consisting of networked home appliances and/or consumer electronics, or a public operator network.

The present invention will significantly improve the capabilities and efficiency (both energy and performance efficiency) by which energy consumption can be monitored in distributed ICT environments. It will significantly decrease manual intervention that is required in current systems to deploy energy monitoring (sub)systems. It will allow connecting to existing (energy) management systems to provide an overall energy management approach. Further it will allow to include many of the existing models for energy consumption monitoring and to use them in a more complete monitoring system.

With respect to an efficient response of the monitoring system to changes of and/or related to said ICT environment it proves to be beneficial to specify a multitude of different actions, processes and interactions that constitute external stimuli to the ECMC, and which trigger the ECMC to seek a suitable reaction and to dynamically adapt the distributed energy consumption monitoring system. In particular the changes may include the adding/removal of a component, changes of a component and/or its characteristics, the adding/removal and/or activation/deactivation of energy consumption monitoring techniques, and/or changes of energy consumption monitoring technique characteristics and/or penalties. It is to be noted that the list of changes is not to be understood as a complete itemization and that further processes that may have an influence on the overall energy consumption or performance characteristics of the ICT environment may be implemented as external stimuli for triggering the ECMC.

Advantageously, the predefined policies for the selection and placement of a specific energy consumption monitoring technique take into consideration the achievable accuracy, performance penalties, and/or energy penalties. In the simplest case, for instance, the policies may exclusively consider the accuracy of the monitoring, hence, the technique(s) for which the assessment performed by the ECMC yields the highest achievable accuracy will be selected as the best single or multiple technique(s). Alternatively or additionally, the fact may be considered that monitoring incurs both performance and energy penalties of both the instrumentation-based and model-based energy consumption monitoring technique, which might influence the selection of a specific energy consumption monitoring technique. For instance, if an instrumentation-based monitoring technique is more inefficient than a model-based technique, and the latter is only slightly more inaccurate, then the policies may specify to still select the model-based technique.

With respect to efficient information management it may be provided that the monitoring system includes an energy consumer component repository (ECCR) configured to store information about specifications of the network components of the ICT environment. Such specifications may be defined by a vector of attribute-value pairs. The attribute specifies a component property, and the value the magnitude of that property. Formally, a component may be defined by a vector $C$ of n pairs, $C=((A_1,V_1),(A_2,V_2),\ldots,(A_n,V_n))^T$. It may be provided that the ECCR is updated whenever a new component is added to the ICT environment. Information on specifications of new components may be retrieved by the ECMC e.g. by means of a plug-and-play solution via USB, by means of a manual connection or via a management based approach.

In addition to the ECCR, an energy consumption model repository (ECMR) may be provided that is configured to store information about available model-based energy consumption techniques. In addition, the ECMR may hold information on specifications of available energy consumption aggregators, which are specific components distributed in the ICT environment to aggregate information on the energy consumption of a certain group or set/subset of components. Again, it may be provided that the ECMR is updated with an energy consumption model (ECM) as soon as the model becomes available in the ICT environment, i.e. whenever a new component having assigned an ECM is added to the ICT environment.

Furthermore, an energy monitoring element repository (EMER) configured to store information about available instrumentation-based energy consumption techniques may be provided. For a specific component, the ECMC may query the EMER to gain information on available instrumentation techniques. The component may also come with its own specification of how it needs to be instrumented, that information being in turn added to the EMER in the form of a new instrumentation-based energy consumption monitoring technique.

With respect to a smooth and reliable selection of ECMs, the provision of a performance monitoring element repository (PMER) configured to store information about available instrumentation-based performance monitoring techniques proves to be advantageous. For each selection assessment of an energy consumption model, the PMER may be checked for whether the necessary instrumentation technique is available to read the relevant performance metrics required as input to the ECM. A newly added component may also come with its own specification of instrumentation-based performance monitoring technique, which is in turn added to the PMER.

According to a preferred embodiment the selection of a specific energy consumption model to be applied to a specific component of the ICT environment includes the steps of searching for energy consumption models associated with similar components, and defining rules that specify how the accuracy of those energy consumption models changes when being applied to said specific component. In the following this kind of selection will be referred to as rule-based selection criterion. More specifically, according to the rule-base selection criterion, for each component rules are defined that specify how the accuracy of the energy consumption model associated with that component changes when the energy consumption model is applied to a similar device. In one embodiment, this specification can be a function (e.g. for a gradual increase of a CPU's clock frequency). In another embodiment, it can be a fixed-sized table that contains specific selected values. The required information may be obtained e.g. from vendor databases, or from databases that are constructed based on many users' input. Independent of the particular embodiment, this rule-base selection criterion states the achievable accuracy of the monitored energy metrics for each variation in the device characteristics.

According to another preferred embodiment the selection of a specific energy consumption model to be applied to a specific component of the ICT environment includes the steps of defining a difference operator that specifies the difference between the specifications of two different components, and determining components for which said difference operator yields a difference below a predetermined similarity threshold. In the following this kind of selection will be referred to as similarity-based selection criterion. Formally, the difference operator defined for two components may take as input two component specifications, $C_1$, $C_2$, and may compute a scalar $d=C_1-C_2$. In one embodiment, the difference operator may be the standard definition of the distance between two vectors. In another embodiment, the difference might be a projection of only the relevant rows of two components (or for vectors that are not compatible) and the difference defined on the resulting vector (formally: $d=p_1(C_1)-p_2(C_2)$, where $p_{1,2}$ are the projection operators), or any other sensible definition. The projection is especially useful in cases where not all attributes of two components are relevant for energy consumption in the sense that the modification of the corresponding attribute's value (e.g. via a component upgrade) has a significant impact on energy consumption.

A similarity query Q may be defined to return the set of all component specifications $C_1$ that are sufficiently similar to a given component specification $C_1$. Formally, the similarity query result is defined based on the difference operator: $Q(C_0)=\{C_i:C_i-C_c\leq d_s\}$, where $d_s$ specifies the similarity threshold, i.e. the minimum required similarity. In one embodiment, a similarity query may retrieve all components (e.g. CPUs) that are identical but a single parameter (e.g. the CPU clock frequency) is within certain bounds. In another embodiment, a similarity query can be specified by a combination (e.g. conjunction) of partial similarity queries that specify the similarity only with respect to a subset of a component specification's vector rows. For instance, such a similarity query may retrieve all CPUs that are identical and both the clock frequency and the level 2 cache size is within certain bounds.

In addition to the external stimuli leading to a triggering of a process in the ECMC as described so far, a self-optimization randomized background process running under the control of the ECMC may be provided. This process continuously optimizes and asynchronously adapts the distributed monitoring system to increase the overall efficiency and accuracy of the energy consumption metrics or any tradeoff between them. The self-optimizing process specifically analyzes changes in the overall monitoring structure and performs, if necessary, reconfigurations that potentially impact multiple collaborating elements, that is, the distributed monitoring system as a whole. As a result, by way of the self-optimizing process the distributed energy consumption monitoring system is dynamically adjusted to relevant changing constraints. This background process is of specific advantage due to the potential complexity and dynamics of the system. More specifically, it is desired to handle external stimuli quickly, while deferring the search for more optimal solutions to the background asynchronous self-optimization process. For instance, the self-optimizing randomized process may be configured to select every 10 seconds a component of the ICT environment on a random basis and to perform various checks on that component, e.g. whether the currently applied model-based techniques are the most updated once, whether the applied models still fit into their local context, etc.

Due to a monitoring system's complexity in real world deployments, a low-overhead informed randomized benefit analysis may be realized that performs single, random configuration changes that appear beneficial and analyzes whether these configuration changes lead to a more optimal overall (long-term) monitoring system. This is important because it requires no knowledge about the distributed network system and decreases energy and performance penalties of the monitoring system itself.

However, to avoid purely random behaviour that might be rather ineffective and that might miss essential locations in the network that may yield good optimization potential, the randomization process may be carried out in an informed fashion. The informed randomization benefit analysis therefore may gain supporting information from the distributed monitoring system, such as by querying for specific, punctual information (e.g. current bandwidth on certain links incurred by the monitoring system, CPU load portion of monitoring system) about the current performance characteristics of the distributed energy monitoring system to improve the identification of benefit of optimizations. The ECMC can then decide to reconfigure the system in the chosen locations of the ICT environment based on an evaluation procedure. For instance, the efficiency of the overall monitoring system may be increased by shifting one or multiple energy consumption model and aggregator elements to components that are able to compute models and aggregates more efficiently.

The self-optimization process may further consider that after a particular reconfiguration it may be required to in turn carry out additional transitive actions and update dependencies in the aggregation structure. For instance, when an aggregation element is shifted, then communication efficiency might decrease, because the aggregation element is now more distant to a source ECM element. Hence, the ECMC might re-evaluate the monitoring system's characteristics and perform additional actions, or undo previously made actions that have shown to not be beneficial.

Furthermore, it may be considered that the ECMC and the self-optimization process might also consume energy themselves and hence, possess their own energy and performance penalties, contributing to the overall efficiency trade-off of the monitoring system. For instance, a distributed query to request information about the performance overhead currently caused by the elements of the aggregation structure requires energy due to computation and communication in the network.

In one embodiment, the self-optimization process can run within the ECMC in a centralized fashion. In another embodiment, the process can run in a distributed fashion, implemented as software modules in a number of agents distributed in the monitoring system.

The actions described under the self-optimization process are also applicable when external stimuli occur, as described previously.

There are several ways how to design and further develop the teaching of the present invention in an advantageous way. To this end, it is to be referred to the patent claims subordinate to patent claims 1 and 13 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings FIG. 1 is a schematic overview of a monitoring system of an ICT environment, and FIG. 2 illustrates a system for energy consumption monitoring according to an embodiment of the present invention.

FIG. 1 shows a schematic overview of a distributed monitoring system in a decentralized ICT environment 1. The networked system consists of components, which may be any kind of device 2 or any kind of a device subcomponent 3, and which can be arranged hierarchically, e.g. CPU, hard drive, and network interface being components of a PC, e.g. several PCs and a switch being components of a part of a local area network (LAN). The energy consumption monitoring of the ICT environment works by selecting and placing suitable energy consumption monitor elements 4 and energy consumption aggregation elements 5 on the components 2, 3 and by aggregating energy metrics towards a single point of aggregation, where the energy consumption of the overall ICT environment 1 then becomes available. In FIG. 1, the aggregation of energy metrics is indicated schematically by the dashed line arrows.

Figure 2:
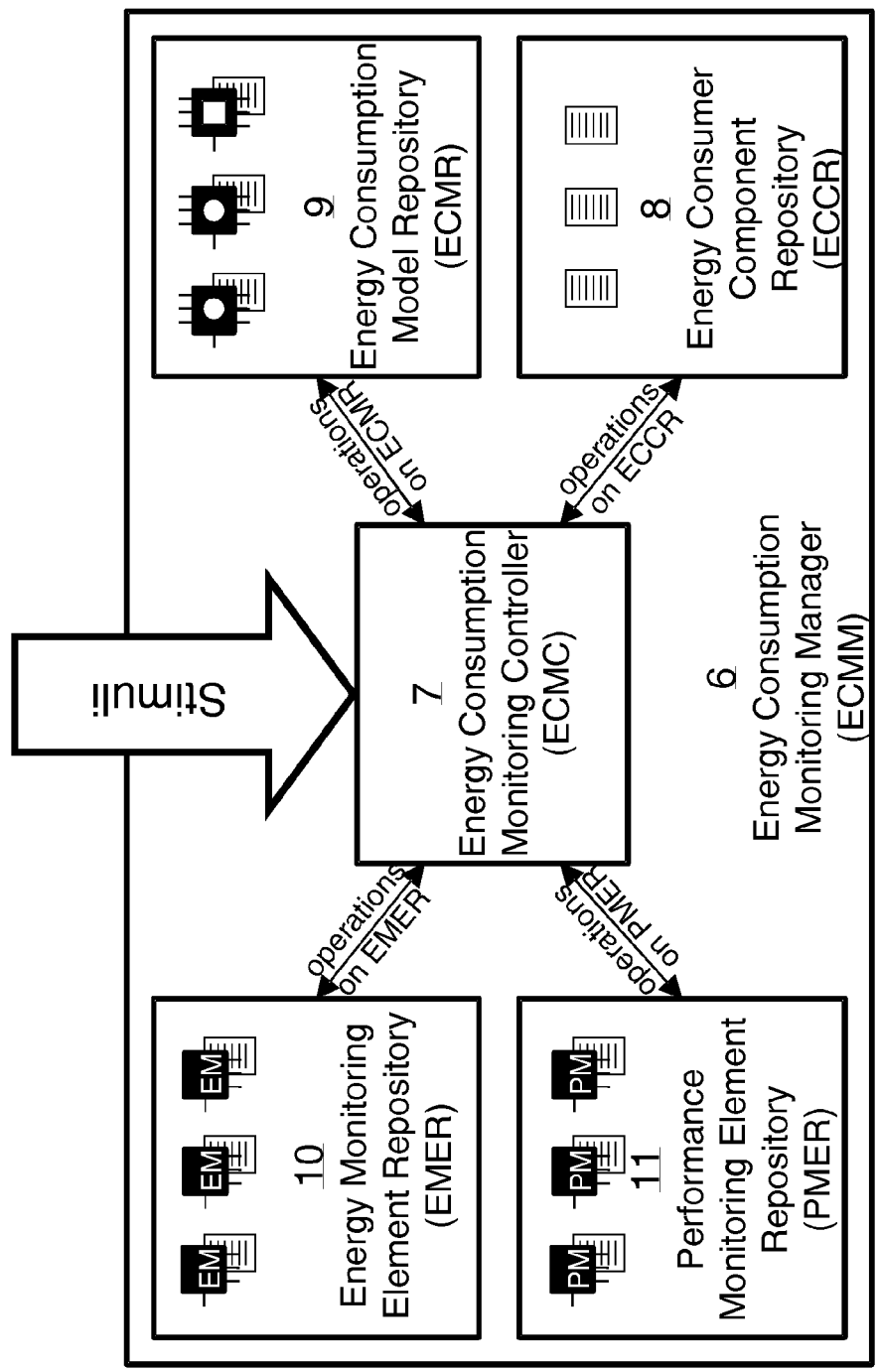

The core component of the monitoring system is an energy consumption monitoring manager (ECMM) 6, shown in more detail in FIG. 2, which contains an energy consumption monitoring controller (ECMC) 7 and various repositories used by the ECMC 7. In the embodiment illustrated in FIG. 2, the ECMC 7 reacts to various stimuli from external to the ECMM 6 and controls the selection and performs the placement of performance and energy consumption monitoring elements 4. Furthermore, the ECMC 7 executes an asynchronous self-optimization algorithm as described above, which is not shown in FIG. 2.

In the following the detailing of the selection and placement process within the basic setup of FIG. 1 is described in detail, that is, how instrumentation-based as well as model-based energy consumption monitoring techniques are selected and placed appropriately to achieve accurate energy consumption monitoring of the ICT environment 1. According to the invention the energy consumption monitoring system is considered as a whole, in contrast to only a single component.

Specifications of the energy consuming components 2, 3 of the ICT environment 1 to be monitored are stored in an energy consumer component repository (ECCR) 8. Specifications are defined by a vector of attribute-value pairs. The attribute specifies a component property, and the value the magnitude of that property. For instance, the properties of a CPU may be the vendor name, model name, clock frequency, bus frequency, level 1 and 2 cache sizes, etc. In the illustrated embodiment, it is assumed that a component is defined by a vector C of n pairs, $C=((A_1, V_1), (A_2, V_2), \ldots, (A_n, V_n))^T$.

A model-based energy consumption monitoring technique, in the following briefly referred to as energy consumption model (ECM), is a specification assigned with one specific component. For instance, the ECM assigned to a component may be provided by the vendor of the component. It derives for that component one or more (instantaneous or accumulated) energy metrics from the component's current performance metrics. Formally, in the most general form, this is two functions $f_1(P(t), A_P(t))=E(t)$, $f_2(P(t), A_P(t))=A_E(t)$, where P is the vector of the component's performance metrics, E is the vector of energy metrics, and $A_P(t)$ and $A_E(t)$ are the accuracy values for each of the rows of performance and energy metrics, respectively. In the simplest case, accuracies can be assumed as static, i.e. constant over time.

Information about available model-based energy consumption techniques is stored in an energy consumption model repository (ECMR) 9. Whenever a new component having assigned an ECM is added to the ICT environment or an already existing component gets assigned an ECM, the ECMR 9 is updated with the respective specifications of the ECM.

According to the invention a synchronous process is defined that is executed based on a multitude of stimuli that occur external to the ECMC 7. External stimuli may include the following actions and/or processes:

Adding/removal of a component
Change of a component or its characteristics (e.g. component or subcomponent is replaced, a component's internal structure changes, its firmware is updated, etc.)
Adding or removal of a monitoring technique, for instance, when a new instrumentation-based monitoring technique becomes available for use with some components in the network
Explicit (de)activation of a monitoring technique
Interaction with energy management system
Change of monitoring technique characteristics/penalties
Change of system structure (e.g. network topology)
Change of component/system performance
Actions induced by the asynchronous self-optimization algorithm It is to be noted that the listing is not complete and that depending on specific requirements and circumstances further actions/processes can be implemented as external stimuli that trigger a reaction of the ECMC 7.

As mentioned above, a synchronous process is triggered by a stimuli, and in such an event, the ECMC 7 selects the most suitable energy consumption monitoring technique(s) to satisfy the specific change. According to the invention specific selection criteria are considered in a combined approach with instrumentation-based as well as model-based energy consumption monitoring techniques. In the following, selection and placement methods are described based on the stimuli "adding of component".

In one selection method, the ECMC 7 determines which instrumentation-based monitoring technique(s) can be used for the newly added component. The ECMC 7 first checks if the device or its power-supplying source is sufficiently instrumented with means for energy consumption monitoring. If this is the case, for example if the component is powered by Power over Ethernet (PoE), the ECMC 7 identifies the energy consumption meter for the component. The meter can be located in the device itself or at a power supplying component. The ECMC 7 may also query an energy monitoring element repository (EMER) 10 to gain information on available instrumentation techniques. The component may also come with its own specification of how it needs to be instrumented, that information being in turn added to the EMER 10 in the form of a new instrumentation-based energy consumption monitoring technique.

In another selection method, in particular being applied in case the respective device is not equipped with appropriate instrumentation, available model-based monitoring techniques are assessed based on a rule-based selection criterion or a similarity-based selection criterion. In the first criterion (rule-based selection criterion) for each component, rules are defined that specify how the accuracy of the energy consumption model associated with that component changes when the energy consumption model is applied to a similar device. Independent of the particular embodiment, the rule-based selection criterion states the achievable accuracy of the monitored energy metrics for each variation in the device characteristics. The second criterion (similarity-based selection criterion) is based on similarity between components. For that, the criterion defines a difference operator for two components. Formally, the difference operator takes as input two component specifications, $C_1$, $C_2$, and computes a scalar $d=C_1-C_2$.

In order to select the best model-based monitoring technique(s), the two previously mentioned selection criteria can be used, either one or both of them. When the rule-based criterion is used to find a suitable model-based monitoring technique, existing energy consumption models are applied via the rule-based selection criterion to the newly added device. For each application, the obtainable accuracy is output by the rule-based criterion, such that the most accurate or a set of sufficiently accurate energy consumption model(s) can be determined.

When the similarity-based criterion is used to find similar devices, the most similar device output by this criterion is used to determine the most suitable or the set of sufficiently suitable energy consumption model(s). The application of any combination of both methods based on the two criteria outputs one or more energy consumption models that are considered suitable for the newly added device. The second method is particularly useful when the first method is not able to find a suitable model. However, if the second method is used only, no information is available about how accurate the model associated with the initial component is when applied to the new component (however, a certain accuracy can be expected in this method if only very similar devices are considered).

For each selection assessment for both selection criteria, a performance monitoring element repository (PMER) 11 is checked for whether the necessary instrumentation technique is available to read the relevant performance metrics required as input to the energy consumption model. The newly added component may also come with its own specification of instrumentation-based performance monitoring technique, which is in turn added to the PMER 11. From all monitoring techniques that are found by any combination of the aforementioned methods, the best single or multiple technique(s) are selected. To the end of specifying what techniques are the best techniques to react upon a certain change of and/or related to the ICT environment policies will be defined that consider certain aspects, in particular accuracy, performance penalties (i.e. an impairment of the overall system performance caused by the application of a specific energy consumption monitoring technique) and energy penalties (i.e. an increase in energy consumption caused by an applied monitoring technique itself).

In a preferred use case, multiple techniques are selected to achieve the monitoring of a multitude of energy parameters that a single technique may not provide. In another case, only the technique with the best accuracy is chosen (applicable only in the rule-based approach). In another case, if no rule-based solution can be found, the most similar device is used. In yet another case, any combination of performance and energy penalty is considered by any formal definition of these (e.g., the degrees of penalties allowed). Moreover, a model-based monitoring technique can be preferred over an instrumentation-based monitoring technique if it is more optimal in terms of accuracy, performance penalty, and energy penalty or any combination thereof.

Further it is considered that an energy monitoring technique might incur a constant overhead for a dynamic number of monitored components. For instance, if polling by SNMP already retrieves the power consumption of all ports of a PoE switch, then when a new component (e.g. IP phone) is plugged into a port of that switch, monitoring of that component is accomplished with no additional overhead.

In other stimuli events than "adding a component", a process similar to the process when a component is added is triggered to update the distributed monitoring system accordingly. For instance, in the event of a new instrumentation-based monitoring technique becoming available for use with some components in the network, the new technique might be more efficient (in terms of accuracy, energy and performance penalty) than the technique currently used for a specific component. If the ECMC 7 detects that the new technique is more efficient in terms of accuracy, energy penalty, and performance penalties, it replaces the current with the new monitoring technique.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for energy consumption monitoring in an Information and Communications Technology (ICT) environment, wherein said ICT environment (1) includes a multitude of energy consuming electrically-powered components (2, 3) that have instruments for energy consumption monitoring and have energy consumption models that derive one or more energy consumption metrics for the respective component (2, 3) from said component's (2, 3) current performance metrics, the method comprising the steps of:
  ascertaining changes related to said ICT environment (1) using an energy consumption monitoring controller (7);
  performing an assessment of available energy consumption monitoring techniques that use at least one of (a) the instruments for energy consumption monitoring and (b) the energy consumption models; and
  based on the result of said assessment selecting one or more of the energy consumption monitoring techniques that best satisfy said change of said ICT environment (1) according to predefined energy consumption monitoring policies that specify parameters according to which the result is analyzed.

2. Method according to claim 1, wherein said changes related to said ICT environment (1) include at least one of changing at least one of the components changing characteristics of at least one of the components, changing the energy consumption monitoring techniques, and changing penalties in the energy consumption monitoring techniques.

3. Method according to claim 1, wherein said predefined energy consumption monitoring policies for the selection of the energy consumption monitoring technique take into consideration at least one of achievable accuracy, performance penalties, and energy penalties.

4. Method according to claim 1, further comprising selecting the specific energy consumption model to be applied to a specific one of said components (2, 3), where the selecting step includes the steps of,
  searching for energy consumption models associated with similar components (2, 3), and
  defining rules that specify how the accuracy of those energy consumption models changes when being applied to said specific component (2, 3).

5. Method according to claim 4, wherein information required for defining said rules are obtained from databases that are constructed on the basis of at least one of users' inputs and vendors' specifications.

6. Method according to claim 1, further comprising selecting the specific energy consumption model to be applied to a specific one of said components (2, 3), wherein the selecting step includes the steps of,
  defining a difference operator that specifies the difference between the specifications of two different components (2, 3), and determining components (2, 3) from said multitude of components for which said difference operator yields a difference below a predetermined similarity threshold.

7. Method according to claim 6, wherein said difference operator is based on components' (2, 3) attributes only that are most relevant with respect to energy consumption.

8. Method according to claim 1, wherein the method is an asynchronous self-optimization process that performs single configuration changes that appear beneficial with respect to an optimization of the monitoring process.

9. Method according to claim 8, wherein said configuration changes are carried out randomly.

10. Method according to claim 8, wherein the decision of carrying out certain configuration changes takes into consideration supporting information about the current performance characteristics of the monitoring process.

11. Method according to claim 8, wherein said self-optimization process is run by said energy consumption monitoring controller (7).

12. Method according to claim 8, wherein said self-optimization process is run by software modules implemented in a number of agents that are distributed over said ICT environment (1).

13. System for energy consumption monitoring in an ICT environment, the system carrying out the method according to claim 1, wherein
the system comprises the energy consumption monitoring controller (7) configured to ascertain the changes related to said ICT environment (1) and to perform the assessment of the available energy consumption monitoring techniques, wherein said energy consumption monitoring controller (7) includes selection means for selecting, based on the result of said assessment, one or more of the energy consumption monitoring techniques that best satisfy said change of said ICT environment (1) according to the predefined policies.

14. System according to claim 13, including an energy consumer component repository (8) configured to store information about specifications of said components.

15. System according to claim 13, including an energy consumption model repository (9) configured to store information about said available energy consumption techniques that use the energy consumption models.

16. System according to claim 13, including an energy monitoring element repository (10) configured to store information about said available energy consumption monitoring techniques that use the instruments for energy consumption monitoring.

17. System according to claim 16, wherein said energy consumption monitoring controller (7) is configured to query said energy monitoring element repository (10) to retrieve information about said available energy consumption techniques that use the instruments for energy consumption monitoring.

18. System according to claim 13, including a performance monitoring element repository (11) configured to store information about available performance monitoring techniques that use the instruments for energy consumption monitoring.

19. System according to claim 13, including distributed agents in which software modules are implemented running an asynchronous self-optimization process that performs single configuration changes that appear beneficial with respect to an optimization of the monitoring process.

20. System according to claim 13, wherein said ICT environment (1) includes at least one of networked office equipment and industrial machines.

21. System according to claim 13, wherein said ICT environment (1) includes at least one of networked home appliances and information and entertainment electronic equipment.

* * * * *